(12) United States Patent
Kulha

(10) Patent No.: US 6,275,539 B1
(45) Date of Patent: Aug. 14, 2001

(54) SYSTEM AND METHOD FOR MODULATING A FREQUENCY SIGNAL

(75) Inventor: Steven P. Kulha, Shelby Township, MI (US)

(73) Assignee: Lear Automotive Dearborn, Inc., Southfield, MI (US)

( * ) Notice: Subject to any disclaimer, the term of this patent is extended or adjusted under 35 U.S.C. 154(b) by 0 days.

(21) Appl. No.: 09/119,365

(22) Filed: Jul. 20, 1998

(51) Int. Cl.[7] .............................. H04B 1/04; H04L 27/10; H03C 3/18
(52) U.S. Cl. .................. 375/304; 375/306; 332/100; 331/167; 331/172; 455/107
(58) Field of Search ................................. 332/100, 101, 332/102; 375/272, 303, 304, 306; 455/113, 107; 331/167, 172

(56) References Cited

U.S. PATENT DOCUMENTS

| | | |
|---|---|---|
| 4,733,199 | 3/1988 | Khanna . |
| 5,136,264 * | 8/1992 | Nardozza ............................... 332/102 |
| 5,437,057 * | 7/1995 | Richley et al. ......................... 445/41 |
| 5,793,261 * | 8/1998 | Boling, III ............................ 332/102 |

FOREIGN PATENT DOCUMENTS 844571 8/1960 (GB) .
63168839 1/1990 (JP) .

OTHER PUBLICATIONS

Mtisumoto and Imai; GaAs FET Direct Frequency–modulators for 42–GHz–band HDTV Radio Cameras and 7–GHz–band Field Pick–up Transmitters; 1993 IEEE; pp. 663–666.
Dien M. Nguyen; Engineer's Notebook; Inductive Tuned Oscillator; Sep. 1996; pp. 80 & 82.
R. Landauer; IBM Technical Disclosure Bulletin; Frequency Switching; Feb. 1960; vol. 2; No. 5; pp. 94.
Electronic Engineering; Simple Transistor Frequency Shift Keying Oscillator; Aug. 1975; vol. 47; No. 570; pp. 12–13.

* cited by examiner

Primary Examiner—Amanda T. Le
(74) Attorney, Agent, or Firm—Brooks & Kushman P.C.

(57) ABSTRACT

A radio frequency transmitter circuit including a user input switch for producing an input signal, an oscillator for producing a frequency signal having a first frequency, an antenna connected to the oscillator for broadcasting the frequency signal, a coupling circuit disposed a predetermined distance from the antenna, and a microprocessor for enabling the oscillator and activating the coupling circuit in response to the input signal. When the coupling circuit is activated, a reflected impedance, derived from a change in inductance, is reflected from the coupling circuit upon the antenna thereby shifting the frequency signal to a second frequency. Sequentially activating and deactivating the coupling circuit modulates the frequency signal.

7 Claims, 1 Drawing Sheet

SYSTEM AND METHOD FOR MODULATING A FREQUENCY SIGNAL

BACKGROUND OF THE INVENTION

This invention relates to a system and method for modulating a frequency signal through frequency-shift keying.

Frequency-shift keying (FSK), sometimes referred to as frequency-shift modulation or frequency-shift transmission, is a form of modulation in which the modulating wave shifts the output frequency between two predetermined values corresponding to digital values 0 and 1. FSK has been used to modulate unique codes or other information onto frequency signals for remotely controlling systems such as vehicle remote keyless entry systems, garage door openers, estate gate openers, home security systems, etc. The unique codes may be encrypted or rolled.

In the prior art, frequency-shift keying has be achieved by installing a varactor in series with the output of an oscillator circuit producing a frequency signal. A varactor is a semiconductor device, such as a diode, in which the capacitance of the device varies with the applied voltage. Thus, applying an analog voltage to the varactor varies the capacitance of the varactor thereby altering the total capacitance of the oscillator circuit and shifting the signal between two different frequency values.

Although this method of frequency-shift keying has been routinely employed, it has shortcomings. Foremost, varactors are relatively expensive and significantly increase the cost of the FSK circuitry. Accordingly, there is a need for a reliable and less expensive system and method for modulating a frequency signal through frequency-shift keying.

SUMMARY OF THE INVENTION

In a disclosed embodiment of this invention, a radio frequency transmitter circuit broadcasts a modulated signal carrying a unique code or packet of information. The inventive transmitter circuit includes an oscillator circuit for producing a signal having a first frequency and a coupling circuit disposed adjacent the oscillator circuit. When the coupling circuit is activated, a reflected impedance, derived from a change in inductance, is reflected from the coupling circuit onto the oscillator circuit. The reflected impedance alters or increases the inductance of the oscillator circuit thereby shifting the signal to a second frequency. The coupling circuit is sequentially activated and deactivated by a controller in a manner to modulate the signal with a unique code or packet of information. The modulated signal is broadcasted through an antenna by the radio frequency transmitter circuit. When captured by a conventional radio frequency receiver, the broadcasted signal is demodulated. If the code is valid, the receiver operates accordingly.

These and other features of the present invention will be best understood from the following specification and drawings, the following of which is a brief description.

DETAILED DESCRIPTION OF THE PREFERRED EMBODIMENT

Figure 1:
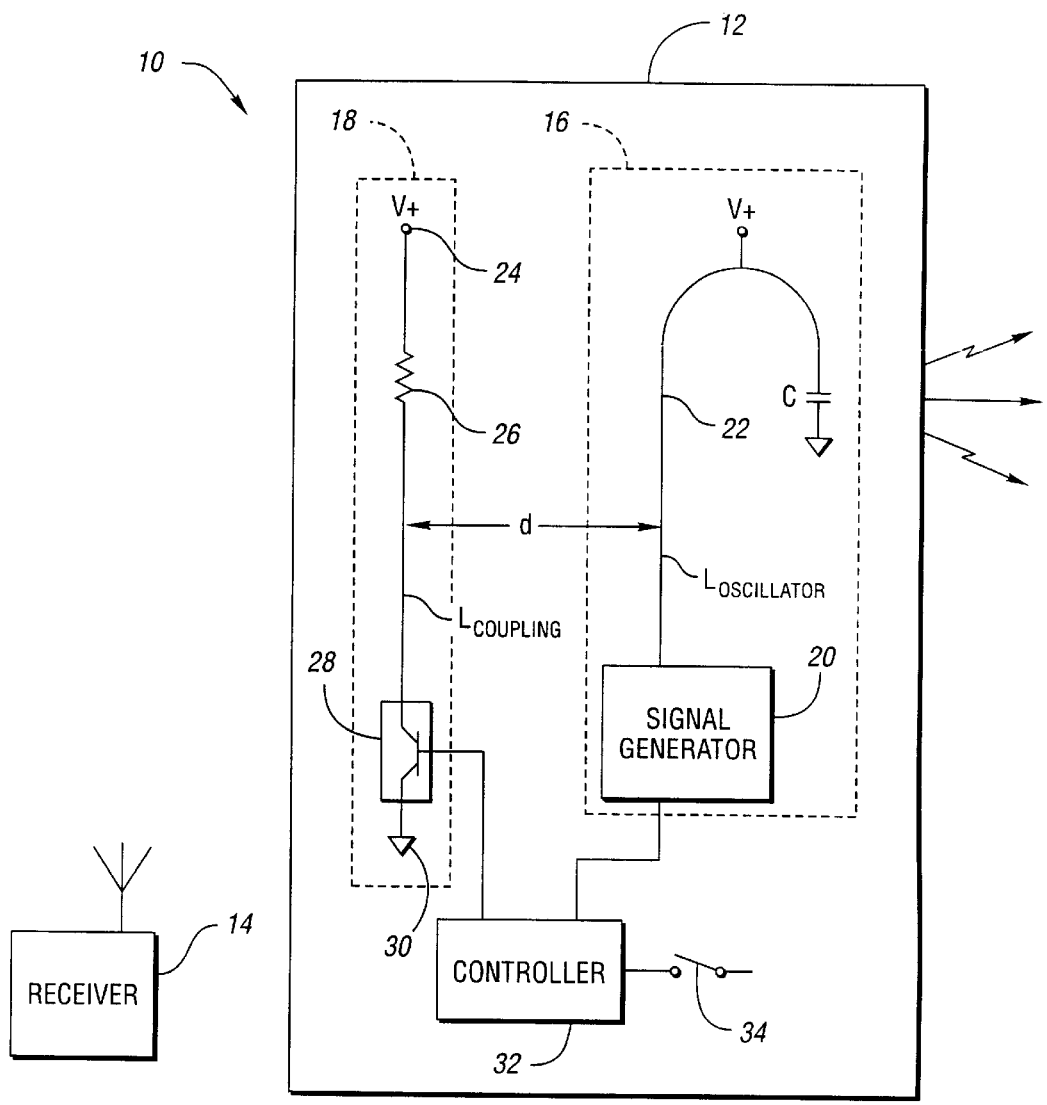
FIG. 1 is an electrical schematic diagram of a radio frequency transmitter and receiver system in accordance with the present invention.

FIG. 1 is an electrical schematic diagram of a radio frequency transmitter and receiver system 10 in accordance with the present invention. The system 10 includes a radio frequency transmitter 12 and a radio frequency receiver 14. The radio frequency receiver 14 is of a conventional design and, thus, captures and demodulates local airborne radio frequency signals.

The radio frequency transmitter 12 includes an oscillator circuit 16 and a coupling circuit 18 disposed adjacent the oscillator circuit 16. The oscillator circuit 16 consists of a signal generator 20 for producing a signal having a first frequency and an antenna 22 electrically connected to the output of the signal generator 20 for broadcasting the signal. The antenna 22 is an inductor which is also part of the oscillator circuit 16. The oscillator circuit 16 has an inductance of $L_{oscillator}$ and a capacitance of C.

The coupling circuit 18 is disposed a predetermined distance d from the oscillator circuit 16. The coupling circuit 18 includes a power source 24, a resistor 26 connected to the power source 24, an activation switch 28, and a ground 30. The activation switch 28 is connected in series between the resistor 26 and the ground 30. When the activation switch 28 is closed, the resistor 26 is switched to the ground 30 and the coupling circuit 18 is activated. Preferably, the activation switch 28 consists of an open collector transistor as shown in FIG. 1.

The radio frequency transmitter 12 further includes a controller 32 and an user input switch 34. The controller 32 is electrically connected to both the activation switch 28 of the coupling circuit 18 and the signal generator 20 of the oscillator circuit 16. Preferably, the controller 32 consists of a microprocessor. The user input switch 34 is electrically connected to the controller 32.

Figure 2:
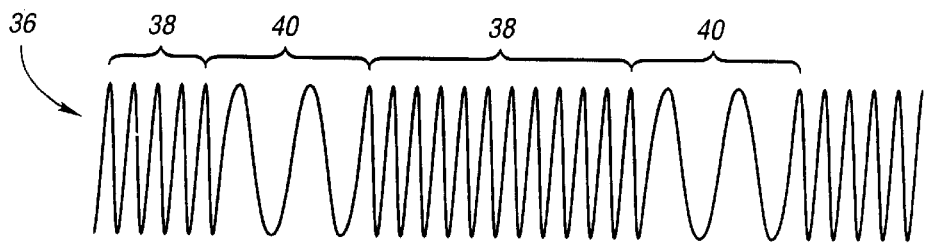
FIG. 2 is a graph of a modulated frequency signal produced and broadcasted by the radio frequency transmitter circuit.

The radio frequency transmitter 12 operates in the following manner to produce and broadcast unique radio frequency signals. FIG. 2 is a graph of a modulated frequency signal 36 produced and broadcasted by the radio frequency transmitter 12. When the user input switch 34 is manually closed, an input signal is produced and transmitted to the controller 32. Upon receipt of the input signal, the controller 32 enables the signal generator 20 and opens and closes the activation switch 28 according to a predetermined sequence or program. While the signal generator 20 is enabled and the coupling circuit 18 is not actuated, the oscillator circuit 16 has an inductance of $L_{oscillator}$ and the oscillating circuit 16 produces a carrier signal having a first or base frequency 38, wherein $$f_{base} = 1/(2\pi\sqrt{(L_{oscillator}C)}).$$

The sequential closing and opening of the activation switch 28 by the controller 32 activates and deactivates the coupling circuit 18. When the coupling circuit 18 is activated, a reflected impedance, derived from a change in inductance corresponding to $L_{coupling}$, is reflected from the coupling circuit 18 onto the antenna 22 of the oscillator circuit 16. As a result, the reflected impedance increases the total inductance of the oscillator circuit 16 from $L_{oscillator}$ to $L_{oscillator} + L_{coupling}$ and, thus, shifts the frequency signal 36 from the first or base frequency 38 to a second or coupled frequency 40, wherein $$f_{coupled} = 1/(2\pi\sqrt{((L_{oscillator} + L_{coupling})C)}).$$

When the coupling circuit 18 is deactivated, the total inductance of the oscillator circuit 16 decreases back to $L_{oscillator}$ and the frequency signal 36 shifts from the second or coupled frequency 40 back to the first or base frequency 38.

Accordingly, by activating and deactivating the coupling circuit 18 in a sequential order, the controller 32 can modulate the frequency signal 36 with a unique code or packet of information as shown in FIG. 2.

The frequency signal 36 is broadcasted by the antenna 22. When captured by the radio frequency receiver 14, the broadcasted frequency signal 36 is demodulated. Preferably, the base frequency 38 is demodulated to correspond to a digital value of one and the coupled frequency 40 is demodulated to correspond to a digital value of zero. If the code is valid, the radio frequency receiver 14 operates accordingly. For example, if the radio frequency receiver is incorporated into a remotely controlled garage door opener, then the receiver will operate to open or close the garage door upon receipt of a valid code.

As described above, the coupling circuit 18 is disposed a predetermined distance d from the oscillator circuit 16. Varying the distance d changes the amount of frequency shift ($f_{base} - f_{coupled}$). Thus, the distance d may be predetermined to produce a specified amount of frequency shift. Typically, the distance d is short for low frequencies and long for high frequencies. For very high frequencies (VHF) and ultrahigh frequencies (UHF), the distance d is approximately one-quarter inch.

In accordance with the present invention, a method of modulating a signal is disclosed. As will be appreciated by one of ordinary skill in the art, the order of the steps of the method is not important to achieving the objects of the present invention. As will also be recognized, the method may be performed in software, hardware, or a combination of both as in a preferred embodiment of the invention.

The steps of the method include generating a signal having a first frequency from an oscillator circuit and selectively altering the impedance of a component within the oscillator circuit to shift the signal to a second frequency. The impedance of the component may be selectively altered by selectively coupling a first inductor to the component. Preferably, the component is a second inductor.

In one embodiment of the present invention, the method includes the step of disposing a coupling circuit a predetermined distance from the oscillator circuit. Accordingly, the embodiment further includes the step of activating the coupling circuit to alter the impedance of the oscillator circuit and shift the signal to a second frequency.

Preferred embodiments of this invention have been disclosed, however, a worker of ordinary skill in the art would recognize that certain modifications would come within the scope of this invention. For that reason, the following claims should be studied to determine the true scope and content of this invention.

What is claimed is:

1. A radio frequency transmitter circuit comprising:

a user input switch for producing an input signal;

an oscillator for producing a frequency signal having a first frequency;

an antenna connected to said oscillator for broadcasting said frequency signal;

a coupling signal disposed a predetermined distance from said antenna; and a microprocessor for enabling said oscillator and activating said coupling circuit in response to said input signal;

said coupling circuit arranged to produce a reflected impedance when activated to alter an inductance of said antenna, thereby shifting said frequency signal to a second frequency upon activation of said coupling circuit.

2. A transmitter circuit as set forth in claim 1 wherein said coupling circuit includes an activation and said controller selectively closes said activation switch to activate said coupling circuit.

3. A transmitter circuit as set forth in claim 2 wherein said activation switch comprises an open collector transistor.

4. A transmitter circuit as set forth in claim 1 wherein said shifting of said frequencies modulates said signal to carry information.

5. A method of modulating a signal comprising:

a) generating a signal having a first frequency from an oscillator circuit; and b) producing a reflected impedance to selectively alter an inductance of an antenna in the oscillator circuit to shift the signal to a second frequency.

6. A method of claim 5 wherein producing the reflected impedance comprises disposing a coupling circuit a predetermined distance from the oscillator circuit.

7. The method of claim 6 wherein step b) further includes activating the coupling circuit to produce the reflected impedance and shift the signal to a second frequency.

* * * * *

UNITED STATES PATENT AND TRADEMARK OFFICE
CERTIFICATE OF CORRECTION

PATENT NO. : 6,275,539 B1
DATED : August 14, 2001
INVENTOR(S) : Steven P. Kulha

It is certified that error appears in the above-identified patent and that said Letters Patent is hereby corrected as shown below:

Column 4,
Line 7, delete "signal" and replace with -- circuit --.

Signed and Sealed this

Twenty-first Day of May, 2002

Attest:

JAMES E. ROGAN
*Director of the United States Patent and Trademark Office*

*Attesting Officer*